United States Patent [19]

Bailey et al.

[11] 4,255,933
[45] Mar. 17, 1981

[54] GEOTHERMAL POWER PRODUCING LOOP

[76] Inventors: Wayne Bailey, R.D. #2, Schaghticoke, N.Y. 12154; Richard Cattell, R.D. #3, Ballston Spa, N.Y. 12020

[21] Appl. No.: 917,095

[22] Filed: Jun. 19, 1978

[51] Int. Cl.³ ............................................. F03G 7/04
[52] U.S. Cl. ........................................ 60/641; 60/675; 60/676
[58] Field of Search ................ 60/641, 676, 675, 398; 290/53

[56] References Cited

U.S. PATENT DOCUMENTS

| | | | |
|---|---|---|---|
| 3,490,996 | 1/1970 | Kelly | 60/641 X |
| 3,983,704 | 10/1976 | McFarland | 60/675 X |

FOREIGN PATENT DOCUMENTS 2458457  7/1975  Fed. Rep. of Germany ............ 60/641

Primary Examiner—Allen M. Ostrager
Assistant Examiner—Stephen F. Husar

[57] ABSTRACT

A power producing loop continuously carrying water picking up geothermal heats and being made into steam and condensate that is continuously returned to said water source, with appropriate means of producing power at proper points in the loop.

3 Claims, 1 Drawing Figure

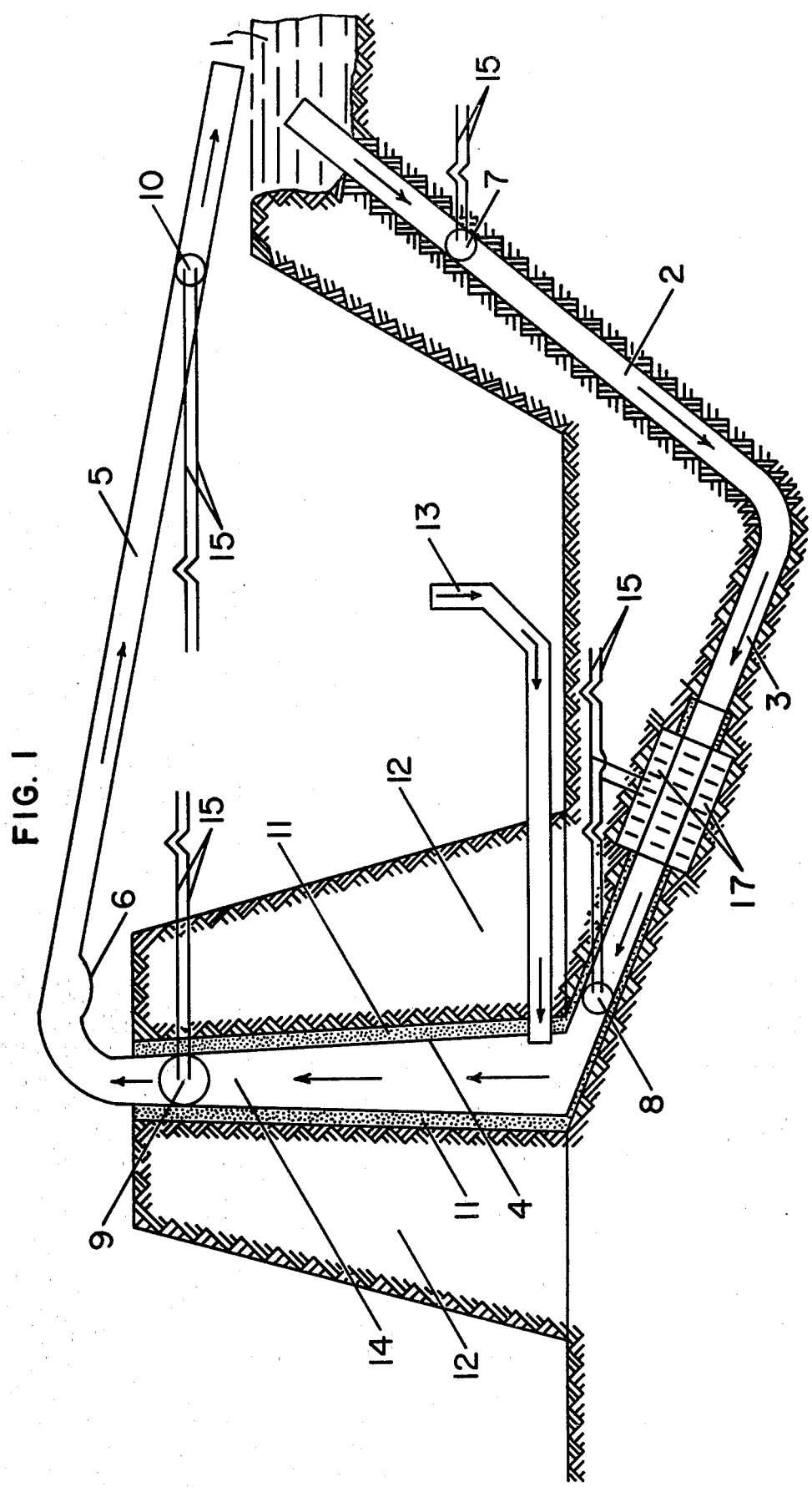

GEOTHERMAL POWER PRODUCING LOOP

There are four types of power production, two with carbon or nuclear fuel, and two that are fueless, continuous or intermittent.

In its present embodiment our invention includes continuous hydro power, continuous steam turbine power and continuous chimney draft power, all serving a common power transmission line with continuous electrical energy. It seeks to avoid the use of fuel whatsoever.

In the drawing, FIG. 1 shows our loop, and how it is arranged to develope different forms of continuous fueless power as its working fluid water changes to steam and returns to condensate (water).

A continuous source of water numeral 1 continuously supplies tube 2 that is reaching deeply in the earth and gaining geothermal heat as a continuous result thereby. It is well known that the earth's temperature increases roughly 88 degrees Fahr. per mile as the earth is penetrated. Tube 2 descendes until steam is being produced copiously therein, all the time.

Tube 3 is drilled to meet tube 2 at its lowest extremity where it can receive said supply of steam from the bottom of tube 2, in a constant manner.

On its way down from water source 1 hydro power is being continuously produced at hydro power turbine station 7.

On the way up steam power is being made at the steam turbine power station designated on the drawing by numeral 8.

Rather than condensing to water the steam issuing from turbine 8 is sufficiently still hot enough to be carried upward by the normal draft in chimney here shown by numeral 4.

As said upgoing steam approaches the upper interior area 14 in chimney 4 it turns a steam—air turbine 9 within said said chimney 4.

As the out going steam leaves turbine 9 it condenses in steam condenser 6 and is momentarily held therein. Relief valve 16 compensates for the variance in pressure in chimney 4. The condensate from steam condenser 6 drops through tube 5 where, at it lower end (or near its lower end) it again produces hydro power at 10 before it returns to original water source 1.

Rigid plastic foam insulation 11 surrounds the upper two thirds of steam pipe 3 while it also surrounds chimney 4 during its entire length. Power obtained from all the hydroelectric and steam sources is carried by power lines 15 on the drawing.

At the bottom of chimney 4 is a second chimney 13 bringing a draft of air into up coming column of steam in chimney 4.

This adds power to the push behind steam in chimney 4 and is reflected in extra power coming from steam-air turbine 9.

Also in case we want to raise the temperature of the steam rising in Tube 3, from the geothermal depts, we may add either a Micro-Wave heater, FIG. 17 on the drawing boiler or other heating means near steam turbine 8, which would raise the temperature of the moving fluid in order to obtain a greater amount of energy out of the power producing loop.

The drawings are diagramatic and do not show the electric generators.

There are electric generators attached to and yet concealed by water wheels 7 and 10 and steam turbine 9 and 8.

We claim:

1. In a geothermal power producing loop, a continuous source of water, a tube taking this water down into the earth, another tube meeting said first tube at its lowest extremity to pick up hot water geothermally heated and bring it to the earth's surface as steam, a chimney to receive such steam and carry it upward as a chimney draft, said chimney draft supplemented by a draft of air entering said chimney sidewise near its base through a second chimney, a a steam condenser connected to the top of said first chimney turning said steam to water, and means for returning said water to said continuous water source, a hydro power plant near the top of said first named tube, a steam turbine near the upper portion of said second named tube filled with steam, an air turbine within the top interior of said first chimney, a water turbine near the lowest point in said means for carrying condensate back to said continuous water source, and electric power generating means rotatively connected to each of said turbines, and a common electric power line electrically connected to each of said electric power generating means.

2. The invention claimed in claim 1 including a microwave heater heating said steam just before it enters said steam turbine near the top of said second tube.

3. The invention claimed in claim 2 including means for holding condensate near the top of said first named chimney.

* * * * *